United States Patent
Glugla (10) Patent No.: US 9,708,993 B2
(45) Date of Patent: Jul. 18, 2017

(54) METHOD AND SYSTEM FOR EXHAUST CATALYST WARMING

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 94 days.

(21) Appl. No.: 14/613,833

(22) Filed: Feb. 4, 2015

(65) Prior Publication Data

US 2016/0222899 A1 Aug. 4, 2016

(51) Int. Cl.

| F02D 41/02 | (2006.01) |
|---|---|
| F01N 3/20 | (2006.01) |
| F02D 41/00 | (2006.01) |
| F02D 41/06 | (2006.01) |
| F02D 41/14 | (2006.01) |
| F02P 5/15 | (2006.01) |

(52) U.S. Cl.
CPC ......... *F02D 41/024* (2013.01); *F01N 3/2006* (2013.01); *F02D 41/0087* (2013.01); *F02D 41/064* (2013.01); *F02D 41/1446* (2013.01); *F02P 5/1506* (2013.01); *F02D 2200/025* (2013.01); *Y02T 10/26* (2013.01); *Y02T 10/46* (2013.01)

(58) Field of Classification Search
CPC .. F02D 41/0087; F02D 41/024; F02D 41/064; F02D 41/1446; F02D 2200/025; F01N 3/2006; F02P 5/1506

USPC ..... 123/179.5, 179.6, 339.1, 339.11, 339.12; 701/103–105, 110–113
See application file for complete search history.

(56) References Cited

U.S. PATENT DOCUMENTS

| 5,483,941 | A | 1/1996 | Cullen et al. | |
|---|---|---|---|---|
| 6,305,347 | B1 * | 10/2001 | Russell | F02D 41/1497 123/295 |
| 6,389,806 | B1 | 5/2002 | Glugla et al. | |
| 6,688,282 | B1 * | 2/2004 | Okubo | F02D 31/003 123/334 |
| 6,978,204 | B2 | 12/2005 | Surnilla et al. | |
| 7,555,896 | B2 | 7/2009 | Lewis et al. | |
| 8,127,744 | B2 | 3/2012 | Genslak et al. | |
| 2009/0173314 | A1 * | 7/2009 | Whitney | F02D 31/002 123/350 |
| 2009/0276130 | A1 * | 11/2009 | Whitney | B60H 1/3205 701/68 |
| 2011/0195817 | A1 * | 8/2011 | Whitney | F02D 31/001 477/121 |
| 2011/0276256 | A1 * | 11/2011 | Kociba | F02D 29/02 701/110 |

(Continued)

*Primary Examiner* — John Kwon
*Assistant Examiner* — Johnny H Hoang
(74) *Attorney, Agent, or Firm* — Julia Voutyras; McCoy Russell LLP (57) ABSTRACT

Methods and systems are provided for leveraging engine skip-fire operation during an engine cold-start to expedite catalyst heating. Based on the heat flux required, the engine may be operated with a group of cylinders selectively deactivated, with spark retard on remaining active cylinders increased, and with engine speed increased to reduce NVH issues during the skip-fire operation. The combination of parameters may be adjusted based on changes in exhaust temperature and NVH limits of the engine.

14 Claims, 6 Drawing Sheets

(56) References Cited

U.S. PATENT DOCUMENTS

2015/0051809 A1\* 2/2015 Glugla ................... F02D 17/02
                                                                                                             701/103

\* cited by examiner

METHOD AND SYSTEM FOR EXHAUST CATALYST WARMING

FIELD

The present application relates to methods and systems for controlling engine speed during an exhaust catalyst warm-up phase in an engine system configured to perform skip-fire combustion.

BACKGROUND AND SUMMARY

Engine out cold-start emissions generated before light-off of an exhaust system catalytic converter may contribute a large percentage of the total exhaust emissions. Various approaches may be used by engine control systems to expedite the attainment of the catalyst light-off temperature.

One example approach, disclosed by Surnilla et al. in U.S. Pat. No. 6,978,204 relies on significant ignition timing retard on one engine bank to produce significant amount of heat and little engine torque output during an engine cold-start condition. At the same time, the other engine bank is run slightly leaner than stoichiometry, and with spark timing slightly retarded from maximum torque timing to maintain the cylinders at a desired engine speed. By running significantly retarded spark on one bank, the airflow needed to maintain idle torque is increased while the combustion is phased late. As a result, heat is released into the exhaust system, getting the catalyst up to operating temperature more quickly. Still other approaches may include the use of transient enrichment, elevated engine speed, or a combination of increased fuel injection and spark timing retard to expedite catalyst warming.

However the inventors herein have recognized that there may be limitations to the amount of spark retard and air flow that can be obtained. For example, if the spark timing is overly retarded, engine combustion may become unstable. As such, this may lead to undesirable NVH effects.

In recent years, engines have been configured to operate with a variable number of active or deactivated cylinders to increase fuel economy, while optionally maintaining the overall exhaust mixture air-fuel ratio about stoichiometry. Such engines are known as variable displacement engines (VDE). Therein, a portion of an engine's cylinders may be disabled during selected conditions defined by parameters such as a speed/load window, as well as various other operating conditions including vehicle speed. A VDE control system may disable a selected group of cylinders, such as a bank of cylinders, through the control of a plurality of cylinder valve deactivators that affect the operation of the cylinder's intake and exhaust valves, or through the control of a plurality of selectively deactivatable fuel injectors that affect cylinder fueling. Further improvements in fuel economy can be achieved in engines configured to vary the effective displacement of the engine by skipping the delivery of fuel to certain cylinders in an indexed cylinder firing pattern, also referred to as a "skip-fire" pattern.

The inventors herein have recognized that the limitations pertaining to the use of spark retard during cold start conditions may be overcome by leveraging skip-fire operation of engine cylinders. In one example, the issues may be addressed by a method comprising: during an engine cold start, operating with a number of cylinders selectively deactivated and spark timing of remaining active cylinders retarded by an amount; and increasing engine speed to maintain an idle torque, the engine speed increased based on the number of deactivated cylinders. In this way, more spark retard may be tolerated in the active cylinders to expedite catalyst heating while the engine speed may be increased to address NVH issues.

As an example, during an engine cold-start, an engine with individual cylinder valve mechanisms may be operated with a cylinder pattern where a number of cylinders are selectively deactivated. The number and identity of individual cylinders valve mechanisms that are deactivated and a remaining number of engine cylinders that are maintained active may be based on the engine temperature at the cold-start. The active cylinders may be operated with spark timing retarded from MBT. As such, since the remaining active cylinders are operated at a higher average cylinder load to produce the same net torque output as with all engine cylinders firing, the active cylinders may be able to tolerate a higher amount of spark retard before combustion stability limits are reached. Thus, spark may be retarded in the active cylinders by a higher amount than would otherwise be possible with all cylinders running To also address any NVH issues arising from remaining active cylinders firing at different overall frequencies, and with larger input (torque) pulses, the engine speed applied to maintain engine idle torque may be adjusted. For example, the engine speed may be increased as the number of firing cylinders decreases while operating the engine with a given amount of spark retard.

In this way, based on the heat flux required during an engine cold-start, various combinations of spark retard, cylinder deactivation (number and pattern), and engine speed adjustment may be applied to expedite catalyst heating without incurring NVH issues. The various combinations may be arranged in look-up tables and used in an open-loop fashion, or closed-loop based on exhaust temperature. The technical effect of deactivating individual cylinder valve mechanisms according to a defined skip-fire pattern during an engine cold-start is that the active engine cylinders may be operated with a larger amount of spark retard. In addition, the engine may be operated with one or more cylinders deactivated, thereby allowing for less heat transfer to the coolant since there is less cylinder surface in contact with the coolant. As such, this allows catalyst heating to be expedited. In addition, by controlling the engine speed based on the cylinder deactivation during the cold-start, catalyst light-off may be achieved with improved NVH characteristics. Overall, engine cold-start performance and emissions compliance may be improved.

The above discussion includes recognitions made by the inventors and not admitted to be generally known. Thus, it should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Operating an engine with skip fire, where at least one cylinder of the engine is skipped and not fired during each engine cycle, may improve fuel economy and emissions during certain operating conditions, such as low engine load. An engine configured to operate with skip fire is illustrated in FIGS. 1-2, and FIGS. 3-4 illustrate cylinder firing plots for the engine of FIGS. 1-2 in a non-skip fire mode (FIG. 3) and in a skip fire mode (FIG. 4). An engine controller may be configured to perform a control routine, such as the example routine of FIG. 5, to adjust an engine speed while operating the engine in a skip-fire mode during an engine cold-start. This allows the heat flux to the engine to be increased, expediting exhaust catalyst activation. An example operation is shown with reference to FIG. 6.

Figure 1:
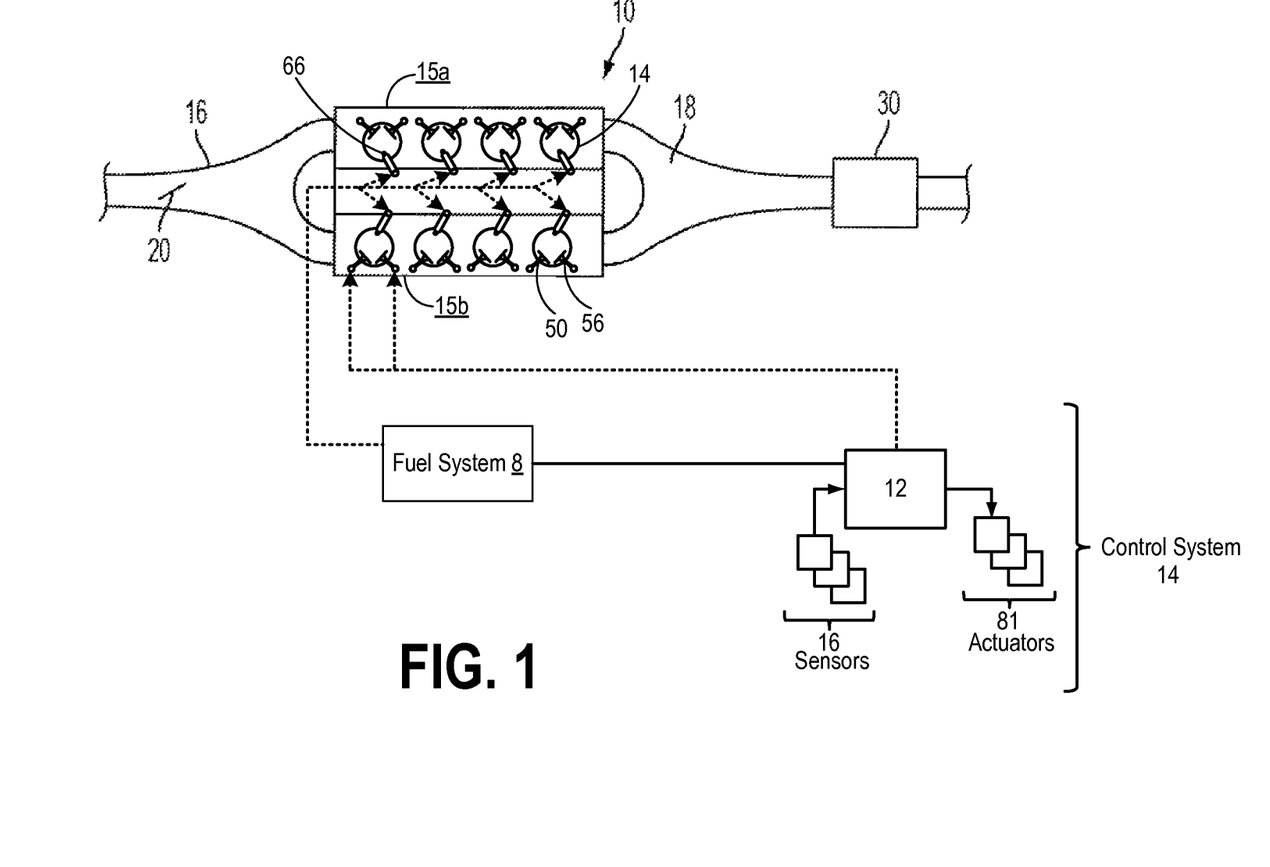
FIG. 1 shows an example embodiment of an engine system layout.

FIG. 1 shows an example engine 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine system 10 may have cylinders 14 with selectively deactivatable intake valves 50 and selectively deactivatable exhaust valves 56. In one example, intake valves 50 and exhaust valves 56 are configured for electric valve actuation (EVA) via electric individual cylinder valve actuators. However, it will be appreciated that in alternate examples, a number of different hardware configurations may be used that enable individual cylinder valve actuation. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). In addition, as elaborated with reference to FIG. 5, one or more cylinders of engine 10 may be selected for selective deactivation during an engine cold-start to increase heat flux to an exhaust catalyst. The selective deactivation may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical. Further, the cylinders may be deactivated according to a predefined pattern, herein also referred to as a skip-fire pattern.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow and spark to the deactivated cylinders may be stopped, such as by deactivating cylinder fuel injectors.

In some examples, engine system 10 may have selectively deactivatable (direct) fuel injectors and the selected cylinders may be deactivated by shutting off the respective fuel injectors while maintaining operation of the intake and exhaust valves such that air may continue to be pumped through the cylinders.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific firing (or skip-firing) pattern based on a designated control algorithm. More specifically, selected "skipped" working cycles are not fired while other "active" working cycles are fired. Optionally, a spark timing associated with a selected firing of a selected working chamber may also be adjusted based on a firing order or firing history of the selected working chamber. For example, as elaborated with reference to FIG. 5, spark timing on active cylinders may be retarded during an engine cold-start to increase exhaust heat. The engine controller 12 may be configured with suitable logic, as described below, for determining a cylinder deactivation (or skip-firing) pattern based on engine operating conditions.

Engine 10 may operate on a plurality of substances, which may be delivered via fuel system 8. Engine 10 may be controlled at least partially by a control system including controller 12. Controller 12 may receive various signals from sensors 16 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in cylinder pressure transducers.

The engine controller may include a drive pulse generator and a sequencer for determining a cylinder pattern based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be closed while fuel flow and spark to the cylinders are stopped.

Since optimal efficiency for a given cylinder is near full output, a lower frequency of firing events may be chosen to reduce output. For example, skipping every other cylinder would produce half of the power, on average. Spacing the firing events out as evenly as possible tends to minimize vibrations due to the varying torque output. Whether all of the cylinders are included in the skip-firing pattern may depend on the fraction of output desired, and other considerations including cylinder temperature, engine temperature, etc.

In this way, by adjusting the cylinder pattern of individual cylinder valve mechanisms and individual cylinder fuel injectors, a desired engine output can be provided by operating fewer cylinders more efficiently, thereby improving fuel economy.

Figure 5:
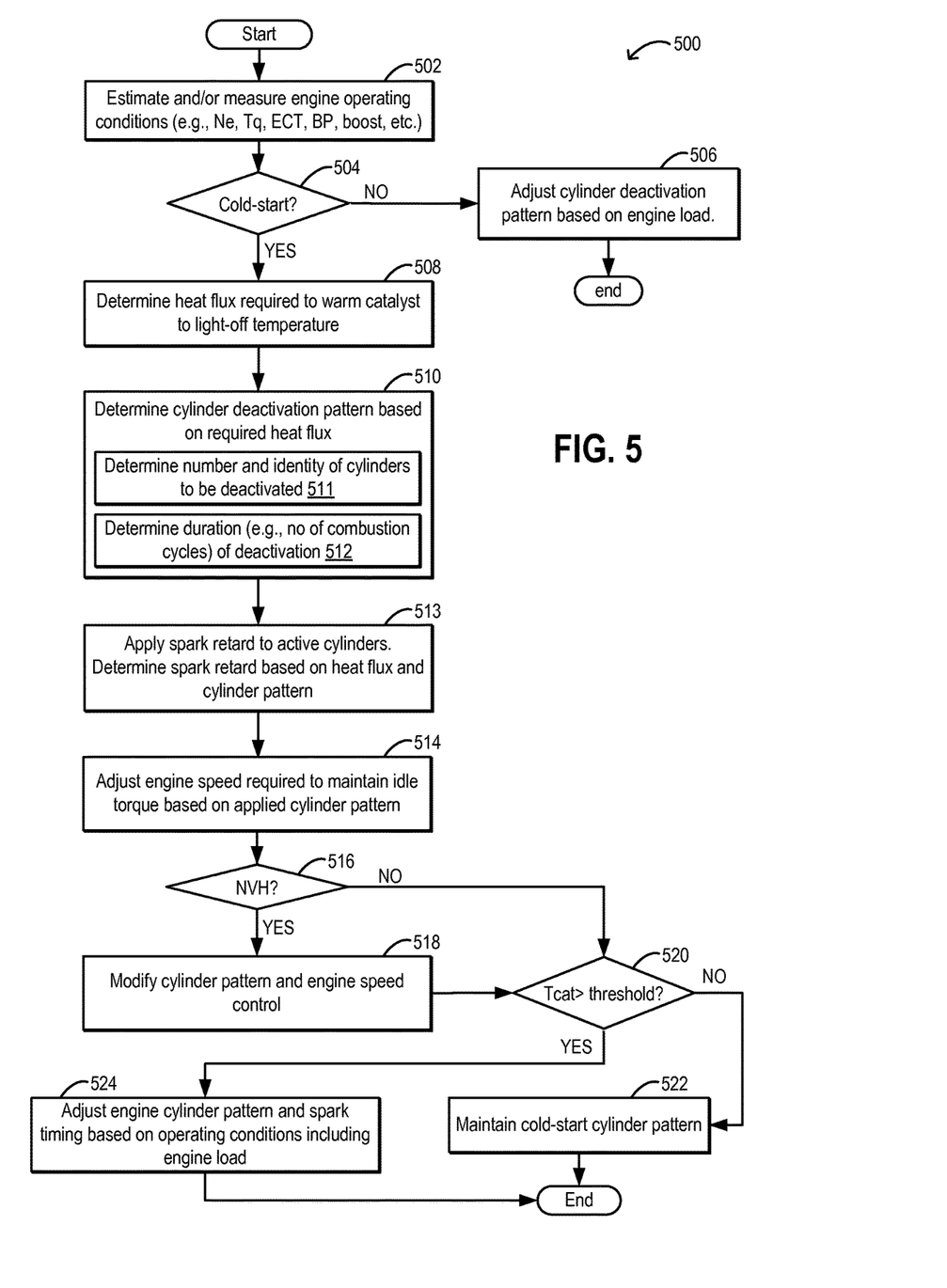
FIG. 5 shows a high level flow chart for adjusting a cylinder deactivation pattern, a spark timing of active cylinders, and an engine speed during an engine cold start to expedite catalyst heating.

As elaborated herein with reference to FIG. 5, the controller may select a cylinder pattern based on an engine temperature at a time of an engine cold-start. Specifically, the cylinder pattern, including the number and identity of cylinders selectively deactivated may be based on a heat flux required at the engine cold-start. The controller may select a pattern where firing is distributed across all cylinders so that none of the cylinders gets too cool. Alternatively, a pattern may be selected where firing is concentrated on a specific set of cylinders to keep them warm and expedite exhaust heating. Additionally, fuel injection to the active cylinders may be adjusted, such as by using retarded injection to further expedite exhaust catalyst heating.

Figure 2:
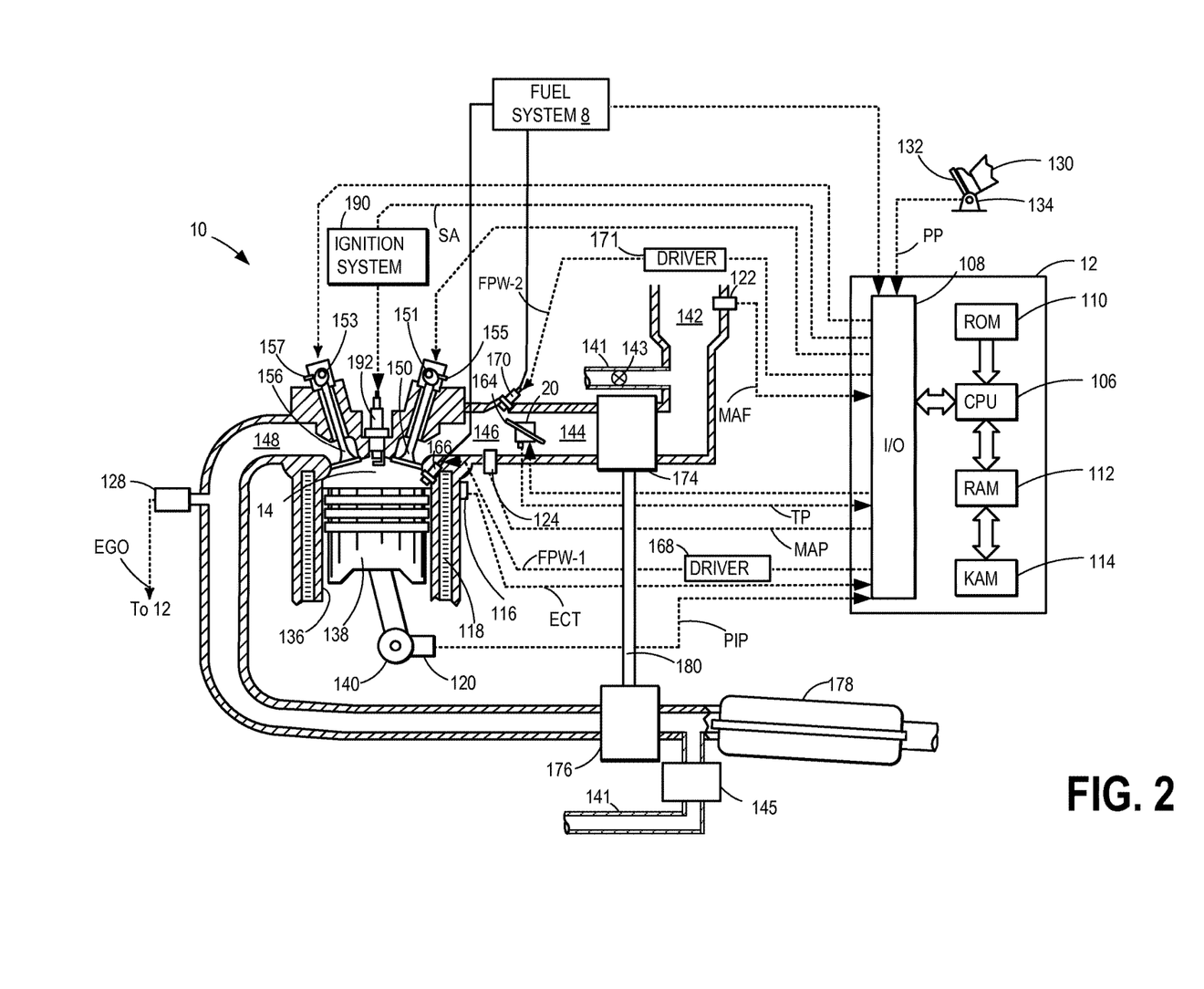
FIG. 2 shows a partial engine view.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and concentration of the exhaust gas.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

During standard engine operation, engine 10 is typically operated to fire each cylinder per engine cycle. Thus, for every 720 CA (e.g., two revolutions of the crankshaft), each cylinder will be fired one time. To allow for combustion in each cylinder, each intake and exhaust valve is actuated (e.g., opened) at a specified time. Further, fuel is injected to each cylinder and the spark ignition system provides a spark to each cylinder at a specified time. Accordingly, for each cylinder, the spark ignites the fuel-air mixture to initiate combustion.

Figure 3:
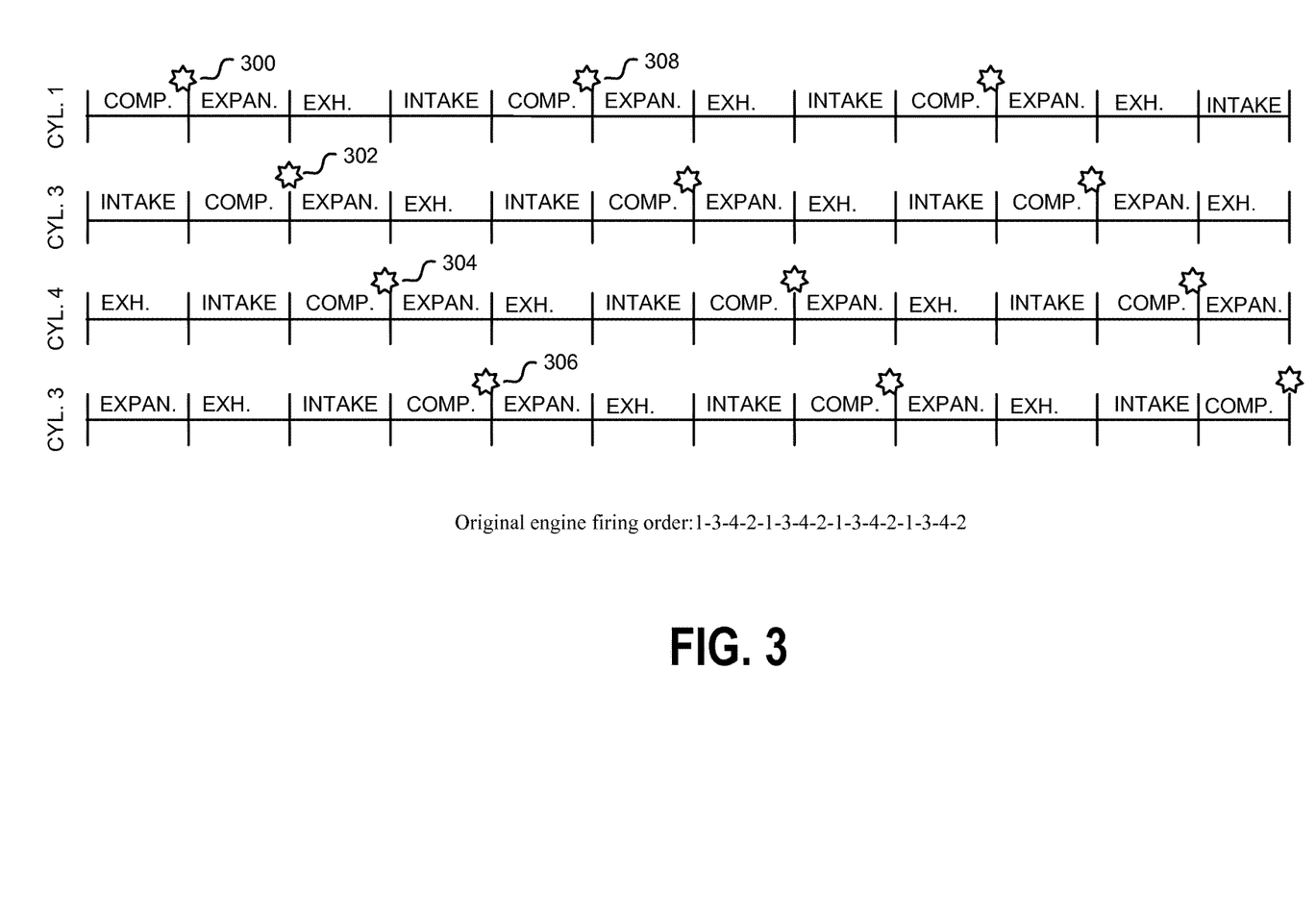
FIG. 3 shows an example cylinder firing plot of an engine operating without skip fire according to an original engine firing order.
Figure 4:
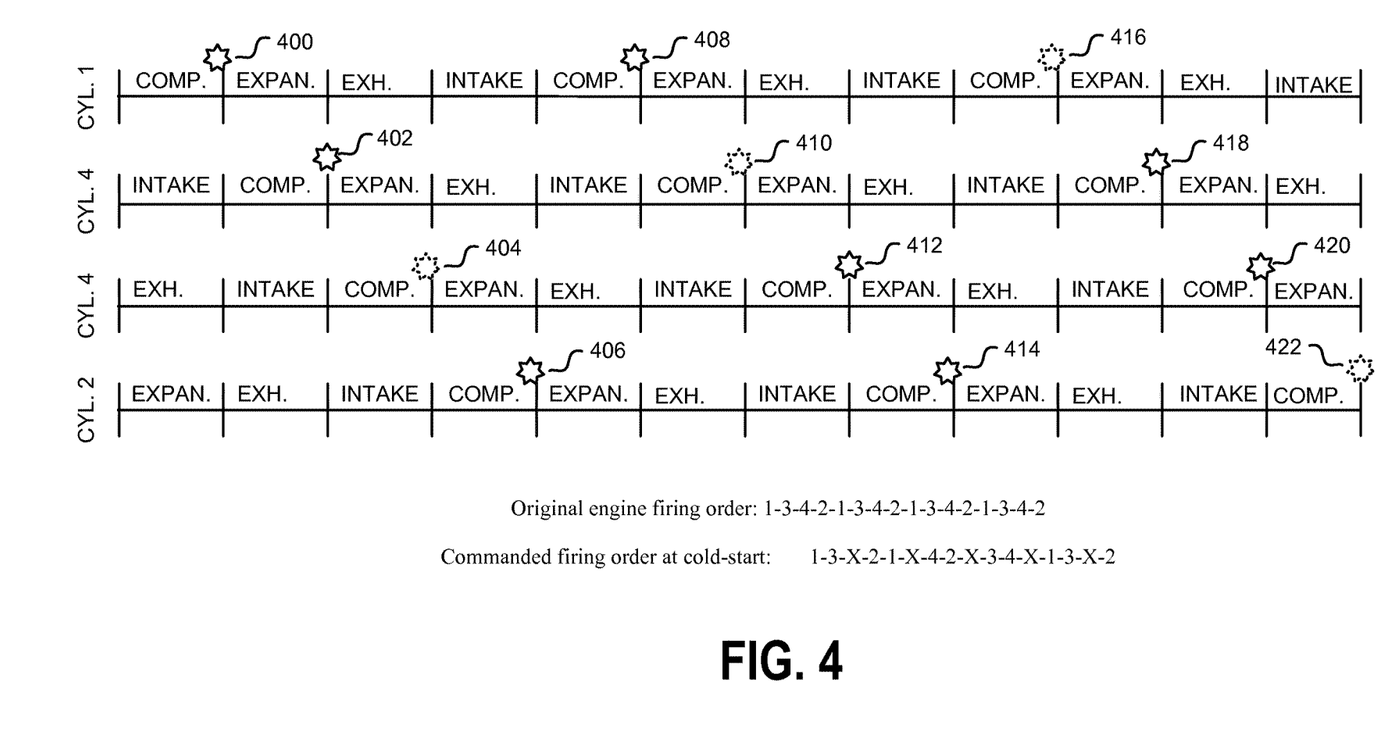
FIG. 4 shows an example cylinder firing plot of an engine operating with skip fire according to a commanded firing order.

FIG. 3 illustrates an example plot of cylinder firing events for an example four cylinder engine (e.g., engine 10 of FIG. 1) during standard, non-skip fire operation. The engine position of each cylinder of the four cylinder engine is described by the traces labeled CYL. 1-4. The vertical markers along the length of traces CYL. 1-4 represent top-dead-center and bottom-dead-center piston positions for the respective cylinders. The respective cylinder strokes of each cylinder are indicated by INTAKE, COMP. (compression stroke), EXPAN. (expansion stroke), and EXH. (exhaust stroke) identifiers.

The engine has an original engine firing order of 1-3-4-2, such that CYL. 1 is fired first, followed by CYL. 3, CYL. 4, and CYL. 2, each engine cycle. Thus, as shown, combustion in CYL. 1 occurs at or near TDC between the compression and expansion strokes, illustrated by star 300. To achieve combustion, fuel is injected to CYL. 1, the intake valve is actuated to drawn in charge air (and is subsequently closed to trap the charge in the cylinder), and combustion is initiated by a spark ignition event. Combustion in CYL. 3 is initiated by a spark, as illustrated by star 302. While CYL. 3 is on a compression stroke, CYL. 1 is on an expansion stroke. Combustion is initiated in CYL. 4 by a spark, as illustrated by star 304. While CYL. 4 is on a compression stroke, CYL. 1 is on an exhaust stroke, and CYL. 3 is on an expansion stroke. Combustion is initiated in CYL. 2 by a spark, as illustrated by star 306. While CYL. 2 is on a compression stroke, CYL. 1 is on an intake stroke, CYL. 3 is on an exhaust stroke, and CYL. 4 is on an expansion stroke. Upon completion of combustion in CYL. 2, a new engine cycle starts and combustion again occurs in CYL. 1, as illustrated by star 308. Combustion then continues according to the engine firing order, as illustrated.

During certain operating conditions, engine 10 may operate in a skip fire mode, where less than all cylinders of the engine are fired each engine cycle. Skip fire mode may be carried out during low load conditions, for example, or other conditions where the per-cylinder fuel quantity to be injected to each cylinder is relatively small (e.g., so small that accurate fuel delivery may be difficult). Further still, skip fire mode may be performed during selected engine cold-starts. During skip fire, one or more cylinders of the engine is skipped (e.g., not fired) during each engine cycle. To maintain desired torque, the fuel is redistributed to the fired cylinders, increasing the per-cylinder fuel quantity, thus reducing fueling errors. Skip fire may also reduce pumping losses, increasing engine efficiency.

In order to skip a designated cylinder, the intake and exhaust valves of the designated cylinder are deactivated (via control of the actuators 152 and 154, for example), e.g., the intake and exhaust valves are maintained closed throughout each stroke of the cylinder cycle. In this way, fresh charge is not admitted to the cylinder. Further, fuel injection, via port injector 170 and/or direct injector 166, for example, is disabled. In some examples, spark (from spark plug 192, for example) may be disabled as well. In other examples, spark may be provided to the designated cylinder. However, without charge air and fuel, even with spark, combustion will not occur in the designated cylinder.

FIG. 4 illustrates an example plot of cylinder firing events for an example four cylinder engine (e.g., engine 10 of FIG. 1) during skip fire operation occurring during an engine cold-start. Similar to FIG. 3, the engine position of each cylinder of the four cylinder engine is described by the traces labeled CYL. 1-4. Vertical markers along the length of traces CYL. 1-4 represent top-dead-center and bottom-dead-center piston positions for the respective cylinders. The respective cylinder strokes of each cylinder are indicated by INTAKE, COMP., EXPAN., and EXH. identifiers.

As explained above, the engine has an original engine firing order of 1-3-4-2. During skip fire, one or more cylinders of the engine are skipped each engine cycle. The number of skipped cylinders may be selected based on operating conditions, such as engine load and engine temperature, as will be explained in more detail below with respect to FIG. 5. Further, a different cylinder may be skipped each engine cycle, such that over a plurality of engine cycles, each cylinder is fired at least once and each cylinder is skipped at least once. Further still, in some engine cycles, over a given revolution of the crankshaft, no cylinders may be fired.

During skip fire, the original engine firing order may be adjusted to achieve a commanded firing order where one or more cylinders are skipped. The commanded firing order may maintain the same basic firing order of the engine, with one or more cylinders skipped each engine cycle, and may alternate skipped cylinders from engine cycle to engine cycle. As shown in FIG. 4, the commanded firing order of the engine during skip fire may fire two cylinders, skip one cylinder, fire two cylinders, skip one cylinder, etc., resulting in a firing order of 1-3-X-2-1-X-4-2-X-3-4-X. In this way, a different cylinder is skipped each time a cylinder is skipped until the pattern repeats.

Thus, as shown, combustion in CYL. 1 occurs at or near TDC between the compression and expansion strokes, illustrated by star 400. Next, combustion in CYL. 3 is initiated by a spark, as illustrated by star 402. CYL. 4, which is scheduled to be fired after CYL. 3 in the original firing order, is skipped. Thus, while a spark may still occur in CYL. 4 during the compression stroke, no combustion is initiated due to the lack of valve actuation and fuel injection, as illustrated by dashed star 404. Combustion in CYL. 2 is initiated by a spark as illustrated by star 406.

During the next engine cycle, combustion occurs in CYL. 1, CYL. 4, and CYL. 2 (as illustrated by star 408, star 412, and star 414, respectively). Combustion does not occur in CYL. 3, as illustrated by dashed star 410. During the following engine cycle, CYLS. 1 and 2 are skipped, as illustrated by dashed stars 416 and 422, respectively, while CYLS. 3 and 4 are fired, as illustrated by stars 418 and 420, respectively. In this way, during some engine cycles, only one cylinder is skipped, while in other engine cycles, more than one cylinder is skipped. However, the commanded firing order as illustrated maintains an even combustion pattern (one cylinder skipped for every two cylinders fired), reducing NVH issues. However, it should be noted that the order and sequence illustrated by FIGS. 3 and 4 are only exemplary in nature and not intended to limit the scope of the description. For example, in some embodiments three cylinders may combust an air-fuel mixture before combustion is skipped in a cylinder. In other embodiments, four cylinders may combust an air-fuel mixture before combustion is skipped in a cylinder. In other embodiments, combustion may be skipped in two cylinders in a row rather than one as depicted by FIG. 4. Further still, in other embodiments, a selected group of cylinders may be continuously skipped during the skip-fire mode while the remaining cylinders are fired. Then, during a subsequent skip-fire mode, a difference set of cylinders may be continuously skipped.

It will be appreciated that the pattern depicted in FIG. 4 is a non-limiting example of a selective deactivation pattern that is chosen and applied during an engine cold-start. As such, the possible patterns may also be a function of the engine mounting (e.g., longitudinal vs transverse mount, durometer versus active mounts, etc.). Thus, depending on the installation arrangement of the engine, deactivation patterns may be mapped to determine acceptable patterns where transmission of vibration into the passenger compartment/seat track is low.

Turning now to FIG. 5, a method 500 for operating an engine with skip fire is illustrated. Method 500 may be carried by a controller, such as controller 12 of FIG. 1, according to non-transitory instructions stored thereon, in order to selectively operate engine 10 in a skip fire mode during an engine cold-start, as described below.

At 502, method 500 includes determining operating conditions. The operating conditions determined include, but are not limited to, engine load, engine speed, operator torque demand, engine fuel demand, catalyst temperature, engine coolant temperature, and ambient conditions such as ambient temperature. The operating conditions may be determined based on output from one or more engine sensors described above with respect to FIG. 1.

At 504, method 500 determines if engine cold-start conditions have been met. In one example, engine cold-start conditions may be confirmed if the engine temperature, or catalyst temperature, is below a threshold. The threshold may correspond to a light-off temperature above which the catalyst is activated. If engine cold-start conditions are not met, for example, if the engine is already sufficiently hot, then at 506, the routine includes adjusting a cylinder deactivation pattern and transitioning into skip fire operation based on one or a combination of various engine operating parameters. These conditions may include engine speed, fuel demand, and engine load being below predetermined respective thresholds. For example, during idle engine operation, engine speed may be low, such as 500 RPMs, and the engine load may be low. Thus, fuel demand, which is based on speed, load, and operating conditions such as engine temperature, manifold pressure, etc., may be too low to accurately deliver the desired amount of fuel. Typically, as engine speed decreases, engine load increases at constant torque and constant number of cylinders firing. By running less cylinders, the average load in the firing cylinders is higher and so the cylinder can tolerate additional spark retard while maintaining acceptable combustion, thereby allowing more heat flux into the catalyst. Skip fire operation conditions may further be based on the controller sensing the engine being in a steady state operating condition, as transient operating conditions may require a fluctuating fuel demand. Steady state operating conditions may be determined by an amount of time spent at current load, or any suitable method. As such, if the engine operating conditions do not indicate that skip fire should be initiated (e.g., if engine load is high), then at 506, the method to maintain current operating conditions and not operate in the skip-fire mode. For example, the current operating conditions may include each cylinder of the engine being fired according to the original engine firing order, with all intake and exhaust valves actuated at appropriate times and fuel injection and spark activated for each cylinder. Method 500 then ends.

If an engine cold-start is confirmed, then at 508, the method includes, during the engine cold-start, estimating a heat flux required to active the exhaust catalyst. For example, as the engine temperature (or catalyst temperature) falls below the threshold (or light-off temperature), the amount of heat flux required may be increased. As another example, as the ambient temperature falls below a threshold (based on the light-off temperature), the amount of heat flux required may be increased.

At 510, the method includes, based on the estimated heat flux, deactivating individual cylinder valve mechanisms for one or more of the plurality of cylinders according to a pattern, the pattern including a total number of deactivated to active cylinders and an order of firing of the active cylinders. For example, at 511, the method includes determining the number and identity of cylinders to be selectively deactivated. The determining may be based on engine temperature at the cold-start, the number of cylinder deactivated increased as the engine temperature decreases. As elaborated below, by deactivating a number of cylinders, a remaining number of active cylinders may be operated with higher spark retard, increasing the amount of heat delivered to the exhaust catalyst. The identity of cylinders that are selectively deactivated may be further based on cylinder firing order. For example, as discussed with reference to the skip-fire pattern of FIG. 4, a pattern may be selected wherein each engine cylinder is intermittently skipped, thereby disabling any one cylinder from cooling too much. In an alternate example, based on the position of the cylinder on the engine block and the cylinder's firing order, a particular cylinder may be preferentially skipped or fired. For example, a cylinder located on the engine block closer to the exhaust passage may be repeatedly fired while a cylinder located on the engine block closer to the intake passage may be repeatedly skipped.

As another example, at 512, a duration of operation in the skip-fire mode may be determined. This may include determining a number of combustion cycles over which the selected cylinders are deactivated. This may further include determining a travelled distance or duration over which cylinders are deactivated. As such, after the stipulated duration/distance, the engine may be returned to the non-skip-fire mode with all engine cylinders firing.

At 513, the method includes operating the remaining active cylinders with spark timing retarded by an amount. The amount of spark retard applied to the active cylinders may be based on the estimated heat flux and the selected cylinder pattern. For example, the amount of spark timing retard may be based on the engine temperature at the cold-start and the number and identity of cylinders that are selectively deactivated. For example, the amount of spark timing retard applied to the active cylinders may be increased as the engine temperature decreases or as the number of deactivated cylinders increases. By leveraging skip-fire operation of engine cylinders during the engine cold-start, more spark retard may be tolerated in the active cylinders before a combustion stability limit is reached or NVH issues are incurred (as compared to the average spark retard that would have been tolerated if all cylinders were active). This enables catalyst heating to be expedited by increasing the amount of heat dissipated to the exhaust.

At 514, the method includes adjusting the engine speed required to maintain idle torque during the engine cold-start based on the applied cylinder deactivation pattern. Specifically, to also address any NVH issues arising from the remaining active cylinders firing at different overall frequencies, and with larger input (torque) pulses, the engine speed applied to maintain engine idle torque may be adjusted. For example, the method may include increasing engine speed to maintain the idle torque, the engine speed increased based on the number of deactivated cylinders. As an example, the engine speed may be increased as the number of firing cylinders decreases while operating the engine with a given amount of spark retard. The increase in engine speed may be further based on the identity of the selectively deactivated cylinders. For example, the firing frequency may increase with increasing engine speed in the time domain, making it feel smoother. Further still, the engine speed may be further based on the amount of spark timing retard applied. For example, the engine speed may be increased as the amount of spark timing retard is increased while a given number of cylinders are deactivated. Engine load may also be increased to maintain torque output. As such, engine speed and load will determine power needed.

An engine controller may be configured to optimize a combination of the selected cylinder deactivation schedule (including how many cylinders are deactivated and while cylinders are deactivated), engine speed schedule, and spark retard schedule based on the desired heat flux to the catalyst using a heat flux model and/or dynamometer experimental data. The results may be arranged in an open-loop look-up table. The controller may retrieve a combination of cylinder deactivation, engine speed, and spark timing from the look-up table based on the engine temperature (or exhaust temperature) at the cold-start. Alternatively, the combination may be retrieved from a look-up table in a closed loop fashion based on exhaust temperature. The look-up table may be further adjusted to include input from accelerometers arranged along the engine block for measuring vibration levels. For example, a combination may be selected that maintain NVH within an NVH limit. As an example, deactivation patterns may be mapped to determine acceptable patterns where transmission of vibration into the passenger compartment/cabin/seat track is low.

At 516, while operating the engine with a number of cylinders selectively deactivated and spark timing of remaining active cylinders retarded by an amount, and with engine speed increased to maintain idle torque, it may be determined if there are any NVH issues. For example, it may be determined if a vibration output of an accelerometer coupled to the engine is higher than a threshold. If yes, then at 518, the method includes modifying the cylinder pattern and engine speed control schedule. For example, the engine speed may be increased as the number of cylinders that are deactivated is increased until an engine NVH limit is reached. Thereafter, the controller may decrease the engine speed while decreasing the number of cylinders that are deactivated, or varying an identity of cylinders that are deactivated.

If NVH limits are not reached at 516, or after modifying the combination of engine speed, cylinder deactivation, and spark retard schedules at 518, the routine proceeds to 520 wherein it may be determined if the exhaust catalyst temperature (Tcat) is higher than a threshold, such as above the light-off temperature. If the exhaust catalyst is not sufficiently warm, then at 522 the method includes maintaining the cold-start cylinder pattern with the determined number of cylinders deactivated, engine speed increased, and spark timing of active cylinder significantly retarded. If the exhaust catalyst is sufficiently warm, and has reached the activation temperature, then at 522 the method includes adjusting one or more of the cylinder pattern, and the spark timing based on the current engine operating conditions, such as engine load. This includes, as at 506, determining if skip-fire conditions are present, and adjusting cylinder deactivation in accordance. Likewise, spark timing and engine speed may also be adjusted based on operating conditions such as engine load and torque demand.

In one example, an engine system comprises an engine including a plurality of cylinders; an exhaust catalyst; a temperature sensor coupled to an engine exhaust; an accelerometer coupled to an engine block for estimating engine vibration; electrically actuated cylinder valve mechanisms coupled to each of the plurality of cylinders; and a selectively deactivatable fuel injector coupled to each of the plurality of cylinders. The engine system may further include an engine controller configured with computer readable instructions stored on non-transitory memory for: during an engine cold-start, estimating a heat flux required to activate the exhaust catalyst; and based on the estimated heat flux, deactivating individual cylinder valve mechanisms for one or more of the plurality of cylinders according to a pattern, the pattern including a total number of deactivated to active cylinders and an order of firing of active cylinders. The heat flux may be estimated based on a difference between a temperature of the exhaust catalyst and an activation temperature, the heat flux increased as the difference increases. Further, the controller may operate the active cylinders with an amount of spark retard based on the estimated heat flux and the pattern. Further still, the controller may adjust an engine speed during the cold-start based on the pattern and the amount of spark retard. Adjusting the engine speed may include increasing the engine speed as the number of active cylinders in the pattern decreases. The controller may include further instructions for: in response to a vibration output of the accelerometer being higher than an NVH limit, adjusting one or more of the pattern, the amount of spark retard, and the engine speed. For example, adjusting the pattern may include one or more of adjusting a total number of deactivated to active cylinders in the pattern and adjusting an identity of deactivated cylinders while maintaining the total number of deactivated to active cylinders. The adjusting may further include reducing the engine speed while maintaining the amount of spark retard or reducing the amount of spark retard while maintaining the engine speed.

Figure 6:
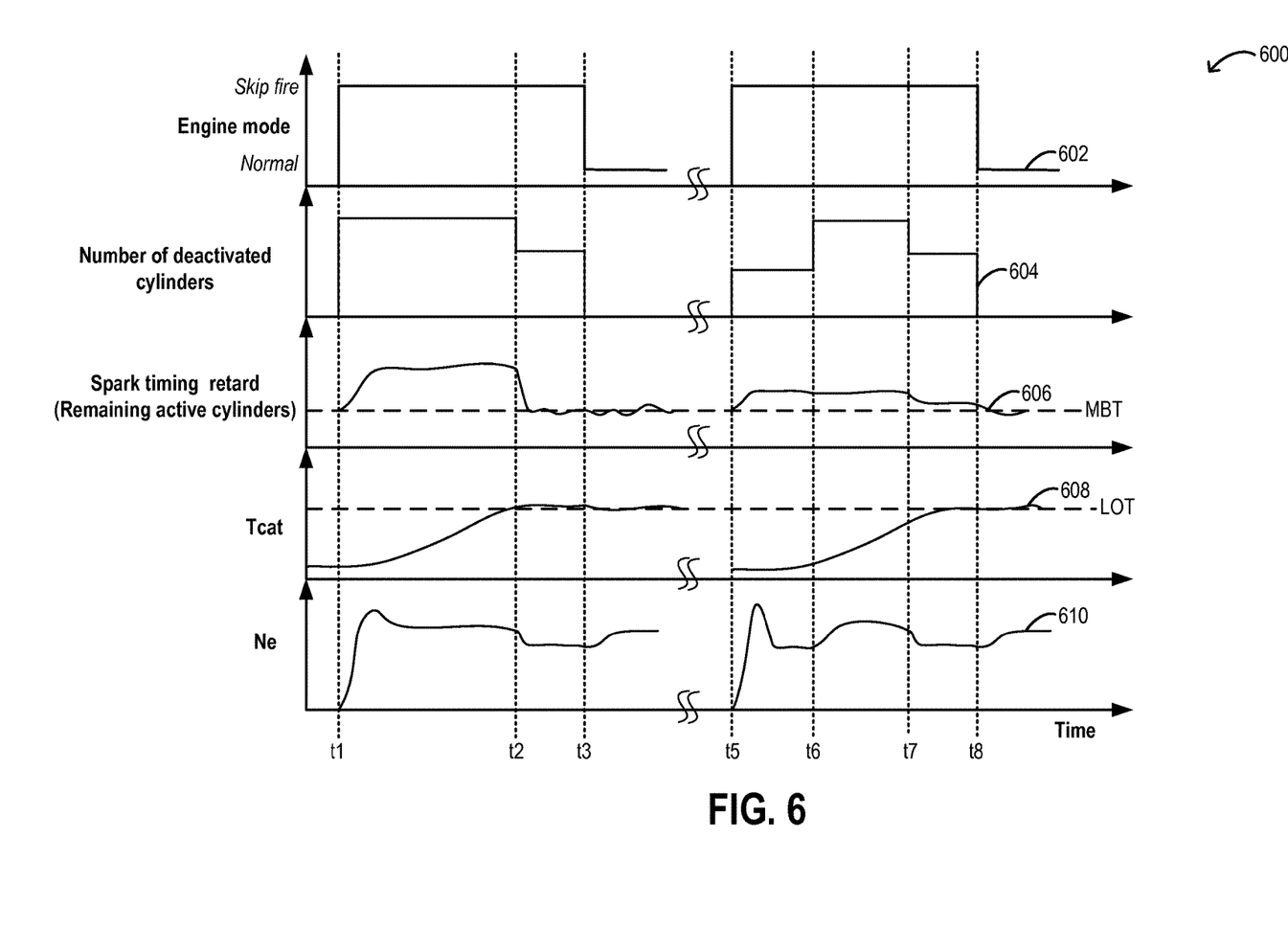
FIG. 6 shows an example engine speed adjustment while operating an engine in a skip-fire mode of operation to expedite catalyst heating during an engine cold-start.

Now turning to FIG. 6, map 600 depicts example adjustments to a combination of cylinder deactivation pattern, spark timing of active cylinders, and engine speed schedules during engine cold-starts. Map 600 depicts engine operating mode (skip-fire or normal) at plot 602, a number of deactivated cylinders at plot 604, spark timing retard applied to active cylinders at plot 606, exhaust catalyst temperature at plot 608, and engine speed at plot 610.

Prior to t1, the engine may be shut-down. At t1, the engine may be started. Due to cold ambient conditions at the time of the engine restart, a temperature of the exhaust catalyst may be below a light-off temperature (LOT, dashed line) and therefore the engine restart may be designated an engine cold-start. Based on the heat flux required at the engine cold-start, at t1, a larger number of cylinders may be deactivated and remaining active cylinders may be operated with spark timing retarded by a larger amount. In addition, engine speed may be increased to maintain idle torque (herein, engine speed is maintained at the elevated level after run-up). Between t1 and t2, the engine may be operated in the skip-fire mode using the significant spark retard of the active cylinders to expedite catalyst heating.

At t2, the exhaust catalyst temperature may exceed the LOT. Accordingly, no further heat flux may be required for catalyst heating. Based on the engine load and torque demand at t2, the engine may be maintained in the skip-fire mode but with a smaller number of cylinders deactivated and more cylinders firing. In addition, spark timing may be returned to MBT. Further still, the idle engine speed may be reduced. At t3, in response to a further change in engine load and torque demand, the engine may exit the skip-fire mode and operate with all cylinders firing and with spark at MBT. In addition, engine speed may be scheduled based on pedal position and torque demand.

Between t3 and t5, a duration of vehicle operation may elapse wherein the engine is operated and then shut down. At t5, the engine may be restarted. At t5, as at t1, due to cold ambient conditions at the time of the engine restart, a temperature of the exhaust catalyst may be below the light-off temperature (LOT, dashed line) and therefore the engine restart at t5 may also be designated an engine cold-start. Herein, substantially the same amount of heat flux may be required at the engine cold-start at t5 as was required at t1. However due to NVH and combustion stability constraints, a smaller number of cylinders may be deactivated and remaining active cylinders may be operated with spark timing retarded by a smaller amount. In addition, engine speed may be decreased (after run-up) to maintain idle torque. Between t5 and t6, the engine may be operated in the skip-fire mode using the lower spark retard of the active cylinders to expedite catalyst heating. However, at t6, an NVH limit may be reached and significant engine vibration may be experienced. To address this, the engine speed may be increased while the cylinder pattern is adjusted to increase the number of deactivated cylinders while spark timing is maintained.

Around t7, the exhaust catalyst temperature may exceed the LOT. Accordingly, no further heat flux may be required for catalyst heating. Based on the engine load and torque demand at t7, the engine may be maintained in the skip-fire mode but with a smaller number of cylinders deactivated and more cylinders firing. In addition, spark timing may be returned towards MBT and the active cylinders may be operated with less spark retard. Further still, the idle engine speed may be reduced. At t8, in response to a further change in engine load and torque demand, the engine may exit the skip-fire mode and operate with all cylinders firing and with spark returned to MBT. In addition, engine speed may be scheduled based on pedal position and torque demand.

In this way, during a first engine cold-start, a controller may be configured to operate the engine with a first group of deactivated cylinders, with a first amount of spark retard applied to remaining active cylinders, and with a first engine speed. In comparison, during a second engine cold-start, the controller may be configured to operate the engine with a second group of deactivated cylinders, with a second, larger amount of spark retard applied to remaining active cylinders, and with a second, higher engine speed. Herein, the second group of deactivated cylinders may include a larger number of deactivated cylinders as compared to the first group. Alternatively, the first and second group of deactivated cylinders may include a common number of deactivated cylinders while an identity of cylinders in the first group does not overlap with the identity of cylinders in the second group. An ambient temperature during the first cold-start may be higher than the ambient temperature during the second cold-start. Further, the engine may have a lower NVH limit during the first cold-start than the second cold-start.

The technical effect of adjusting each of engine speed, a cylinder deactivation pattern, and spark timing of active cylinders is that catalyst heating can be expedited during an engine cold-start. Specifically, skip-fire engine operation can be leveraged during the cold-start to enable active cylinders to be operated with a larger amount of spark retard before combustion stability is affected. As such, the use of additional spark retard enables additional heat to be directed to the engine exhaust, raising catalyst temperatures faster. By concurrently increasing the engine speed required to maintain idle torque, NVH arising from the use of increased spark retard and firing of cylinders at different frequencies (and with different pulses) can be reduced. By expediting catalyst heating, engine cold-start emissions may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, I-3, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a variable displacement engine via an engine controller, comprising:
during an engine cold-start,
operating the engine with a number of cylinders being selectively deactivated and remaining active cylinders with spark timing retarded by an amount; and
increasing engine speed to maintain an idle torque, where the increased engine speed is based on the number of deactivated cylinders.

2. The method of claim 1, wherein the number and an identity of cylinders selectively deactivated is based on engine temperature at the cold-start, and wherein operating the engine with the number of cylinders deactivated includes starting the engine from rest with the number of cylinders deactivated.

3. The method of claim 2, wherein the identity of cylinders selectively deactivated is further based on cylinder firing order.

4. The method of claim 2, wherein the increase in engine speed is further based on the identity of the selectively deactivated cylinders.

5. The method of claim 2, wherein the amount of spark timing retard is based on the engine temperature and the number and identity of the cylinders selectively deactivated, the amount of spark timing retard applied to the active cylinders increased as the number of deactivated cylinders increases.

6. The method of claim 1, wherein the engine speed is increased as the number of deactivated cylinders increases.

7. The method of claim 6, wherein the engine speed is further based on the amount of spark timing retard applied, the engine speed increased as the amount of spark timing retard is increased.

8. The method of claim 1, wherein increasing the engine speed includes increasing the engine speed as the number of cylinders that are deactivated is increased until an engine NVH limit is reached, and then decreasing the engine speed while decreasing the number of cylinders or varying an identity of cylinders that are deactivated.

9. A method of operating a variable displacement engine via an engine controller, comprising:
responsive to sensed engine temperature during a first engine cold-start, operating the engine with a first group of cylinders being selectively deactivated, and remaining active cylinders with a first amount of spark timing retard and at a first engine speed; and
responsive to sensed engine temperature during a second engine cold-start, operating the engine with a second group of cylinders being selectively deactivated, and remaining active cylinders with a second, larger amount of spark timing retard applied and at a second engine speed, higher than the first engine speed.

10. The method of claim 9, wherein operating the engine with the first group of cylinders being selectively deactivated includes starting the engine from rest with the first group of cylinders deactivated, and operating the engine with the second group of cylinders being selectively deactivated includes starting the engine from rest with the second group of cylinders deactivated, wherein the second group of deactivated cylinders includes a larger number of deactivated cylinders as compared to the first group.

11. The method of claim 9, wherein the first and second groups of deactivated cylinders include a common number of deactivated cylinders, and wherein an identity of cylinders in the first group does not overlap with an identity of cylinders in the second group.

12. The method of claim 9, wherein an ambient temperature during the first cold-start is higher than an ambient temperature during the second cold-start.

13. The method of claim 9, wherein the engine has a lower NVH limit during the first cold-start than the second cold-start.

14. A method for operating a variable displacement engine via an engine controller, comprising:
during an engine cold-start,
operating the engine with a number of cylinders being selectively deactivated and remaining active cylinders with spark timing retarded by an amount; and
increasing engine speed based on the number of deactivated cylinders to maintain an idle torque, the engine speed increased as the number of cylinders that are selectively deactivated is increased until an engine NVH limit is reached, and then decreasing the engine speed while decreasing the number of cylinders or varying an identity of cylinders that are deactivated.

* * * * *